United States Patent [19]

Arisaka et al.

[11] Patent Number: 5,561,565
[45] Date of Patent: Oct. 1, 1996

[54] MAGNETIC TAPE RECORDING AND/OR REPRODUCING APPARATUS WITH DETECTING MEANS

[75] Inventors: Katsumi Arisaka, Kanagawa-ken; Tsunenori Yoshinari, Tokyo; Hideyuki Nishida, Kanagawa-ken; Toshiaki Shingu, Kanagawa-ken; Kazunori Masuda, Kanagawa-ken, all of Japan

[73] Assignee: Canon Kabushiki Kaisha, Tokyo, Japan

[21] Appl. No.: 427,488

[22] Filed: Apr. 24, 1995

Related U.S. Application Data

[63] Continuation of Ser. No. 350,505, Dec. 6, 1994, abandoned, which is a continuation of Ser. No. 262,349, Jun. 20, 1994, abandoned, which is a continuation of Ser. No. 872,797, Apr. 22, 1992, abandoned.

[51] Int. Cl.$^6$ .................................................. G11B 5/02
[52] U.S. Cl. ............................................... 360/27; 360/25
[58] Field of Search .................................. 360/27, 25, 15, 360/72.3, 69, 71

[56] References Cited

U.S. PATENT DOCUMENTS

| | | | |
|---|---|---|---|
| 4,811,122 | 3/1989 | Kido et al. ............................. | 360/25 |
| 5,036,407 | 7/1991 | Yoshida et al. ........................ | 360/25 |
| 5,040,082 | 8/1991 | Moro et al. ............................ | 360/27 |
| 5,172,240 | 12/1992 | Nakazato ............................... | 360/27 |
| 5,179,479 | 1/1993 | Ahn ....................................... | 360/72.3 |
| 5,311,373 | 5/1994 | Murabayashi et al. ................ | 360/27 |

FOREIGN PATENT DOCUMENTS

| | | | |
|---|---|---|---|
| 4-030546 | 2/1892 | Japan . | |
| 62-285266 | 6/1986 | Japan ..................................... | 360/27 |
| 3-098433 | 4/3091 | Japan . | |

Primary Examiner—Tan Dinh
Attorney, Agent, or Firm—Robin, Blecker, Daley & Driscoll

[57] ABSTRACT

A magnetic tape recording and/or reproducing apparatus comprises a tape-characteristic-information detecting circuit arranged to detect information on characteristics of a tape from a tape-characteristic-information recording area provided on the tape which is employed as a recording medium, and a circuit-constant setting circuit arranged to set circuit constants of necessary circuits on the basis of the output of the tape-characteristic-information detecting circuit.

9 Claims, 4 Drawing Sheets

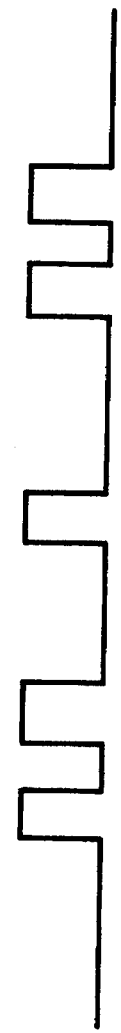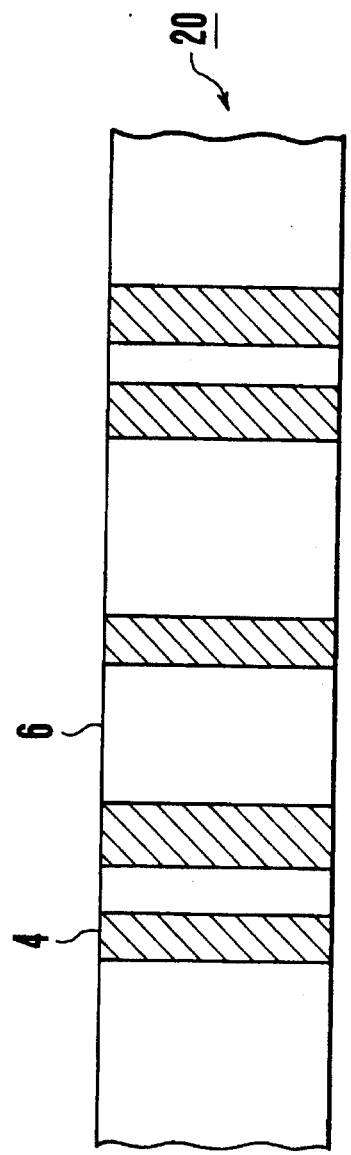
FIG.4(a)
FIG.4(b)
FIG.4(c)
FIG.4(d)

MAGNETIC TAPE RECORDING AND/OR REPRODUCING APPARATUS WITH DETECTING MEANS

This is a continuation application under 37 CFR 1.62 of prior application Ser. No. 08/350,505, which was filed on Dec. 6, 1994 abandoned, which is a continuation of Ser. No. 08/262,349, which was filed on Jun. 20, 1994, now abandoned, which is a continuation of Ser. No. 07/872,797, filed Apr. 22, 1992, now abandoned.

BACKGROUND OF THE INVENTION

1. Field of the Invention

This invention relates to a magnetic recording and/or reproducing apparatus such as a digital audio tape recorder (hereinafter referred to as "DAT") or the like and more particularly to an apparatus arranged to be capable of setting the circuit constants of necessary circuits according to a recording medium being used.

2. Description of the Related Art

The DAT uses a magnetic tape contained in a cassette which is constructed according to a given format and is provided with a detection hole for detection of the characteristics of the magnetic tape. The conventional DAT is arranged to detect the characteristics of the magnetic tape by detecting the presence or absence of the detection hole in the cassette and to set the circuit constants of necessary circuits according to the characteristics detected.

However, subtle differences in characteristics among various magnetic tapes are ignored by the simple method of detecting the presence or absence of the detection hole. Under such a condition, the characteristics of the tape cannot be advantageously utilized, even if the tape has excellent characteristics, because the DAT is designed on the basis of the worst possible values of the tape characteristics. If the DAT were designed for the excellent tape characteristics, some disadvantage would occur for tapes of poor characteristics.

SUMMARY OF THE INVENTION

This invention is directed to the solution of the above-stated problem. It is, therefore, an object of this invention to provide a magnetic tape recording and/or reproducing apparatus which is capable of operating in an optimum condition according to such subtle differences in characteristics among various magnetic tapes that would not be distinguishable by simply detecting a detection hole provided in the cassette of the tape.

In order to attain this object, a magnetic tape recording and/or reproducing apparatus is arranged in accordance with this invention as described in the following paragraphs (1), (2) and (3):

(1) The magnetic tape recording and/or reproducing apparatus comprises tape-characteristic-information detecting means for detecting, from a tape-characteristic-information recording area provided on a tape serving as a recording medium, information on characteristics of the tape; and circuit-constant setting means for setting circuit constants for necessary circuits on the basis of an output of the tape-characteristic-information detecting means.

(2) The tape-characteristic-information detecting means of the magnetic tape recording and/or reproducing apparatus is arranged to optically read the information on characteristics of the tape.

(3) The magnetic tape recording and/or reproducing apparatus further comprises tape moving means for moving the tape until the tape-characteristic-information recording area comes to a position where the information on characteristics of the tape is detectable by the tape-characteristic-information detecting means.

The arrangement described in the above-described paragraphs (1), (2) and (3) enables the apparatus to detect the tape characteristic information from the tape-characteristic-information recording area. Then, the circuit constants of necessary circuits are set on the basis of the information detected. The tape characteristic information can be optically read out by the arrangement of the paragraph (2). The tape can be moved by the arrangement of the paragraph (3) until the tape-characteristic-information recording area comes to a position where the tape characteristic information can be detected by the tape-characteristic-information detecting means.

The above and other objects and features of this invention will become apparent from the following detailed description of an embodiment thereof taken in conjunction with the accompanying drawings.

BRIEF DESCRIPTION OF THE DRAWINGS

FIGS. 4(a) to 4(d) show waveforms of signals obtained at various parts of FIG. 2.

DETAILED DESCRIPTION OF THE PREFERRED EMBODIMENTS

Figure 1:
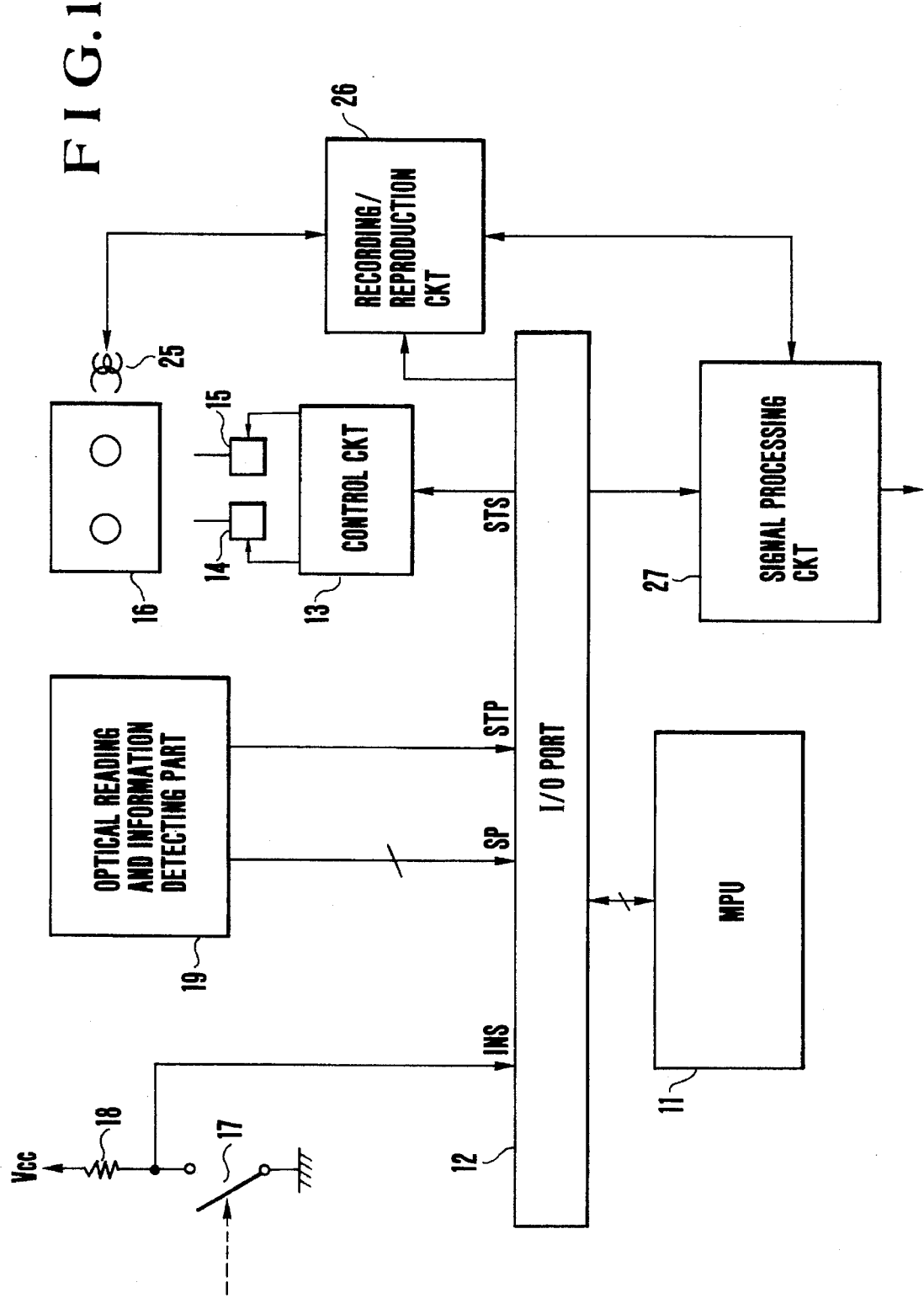
FIG. 1 is a block diagram showing the essential parts of an embodiment of this invention.
Figure 2:
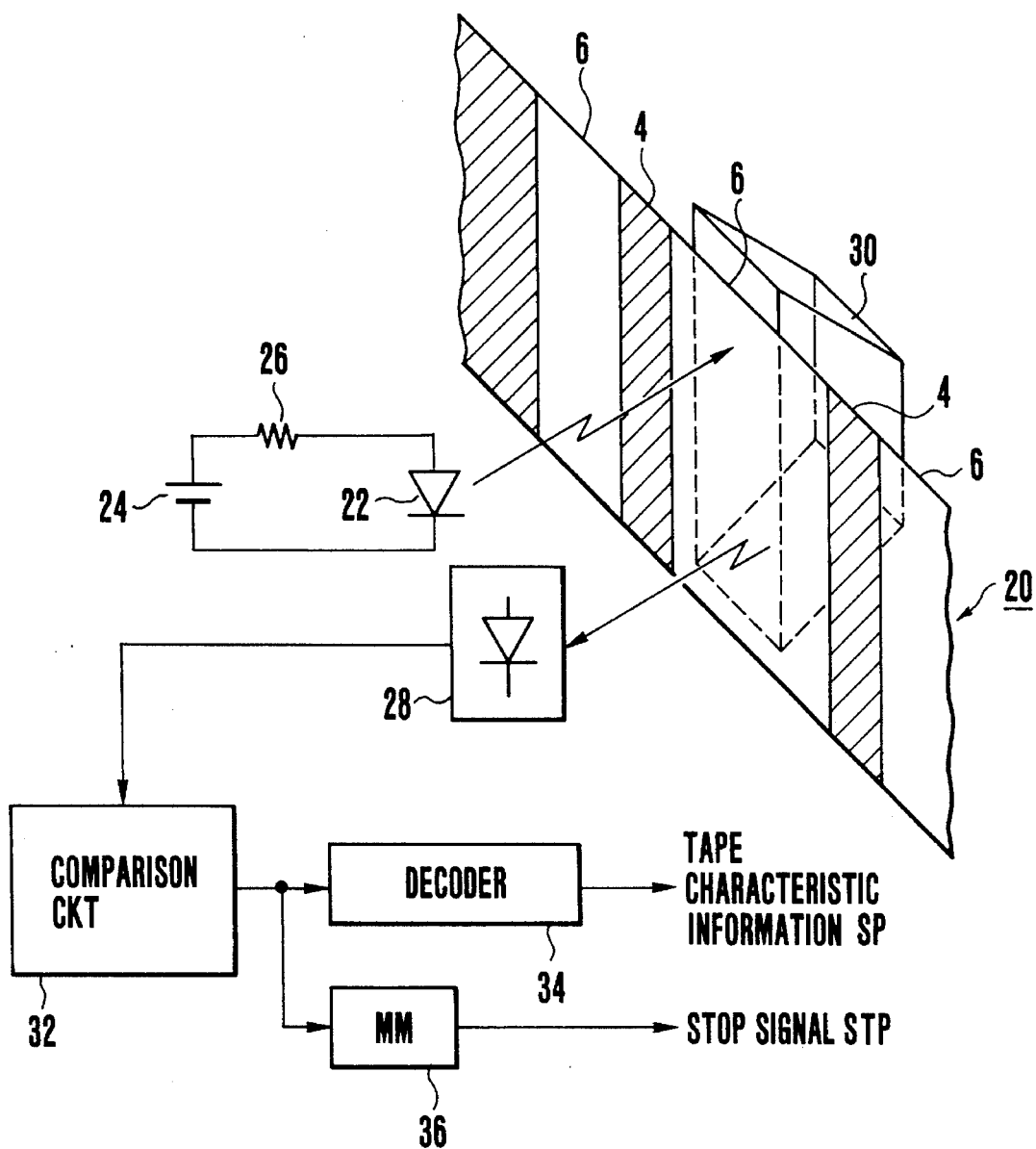
FIG. 2 is a block diagram showing an optical reading and information detecting part.
Figure 3:
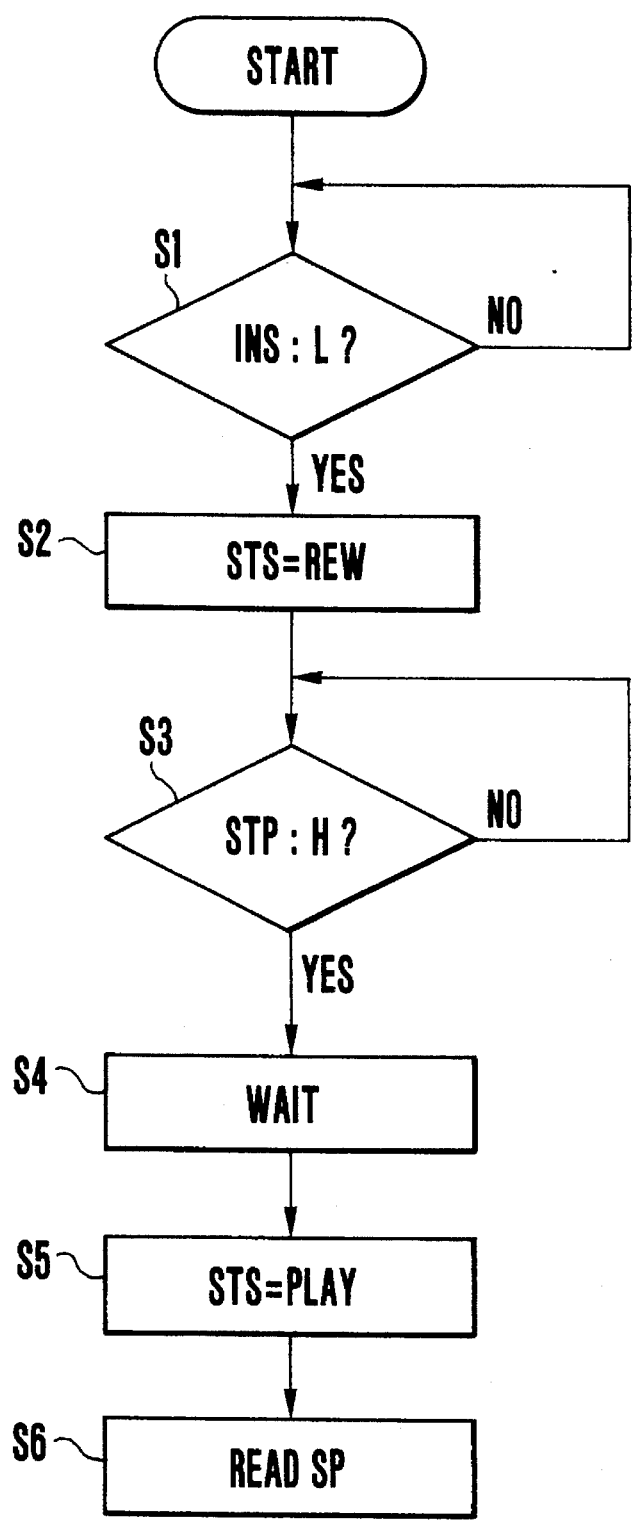
FIG. 3 is a flow chart showing the processing operation of an MPU (microprocessor unit).

The following describes the details of this invention through an embodiment thereof:

FIGS. 1 and 2 are block diagrams showing the essential parts of a magnetic tape recording and reproducing apparatus which is arranged as the embodiment of this invention, FIG. 1 shows circuitry blocks. FIG. 2 shows the blocks of a part arranged to optically read and detect tape characteristic information. FIG. 3 is a flow chart showing the processing operation of a microprocessor unit (hereinafter referred to as "MPU" ) shown in FIG. 1.

In FIG. 1, the illustration includes the MPU 11; an I/O (input/output) port 12; a reel motor control circuit 13; a reel motor 14 arranged on the side of a supply reel; a reel motor 15 arranged on the side of a take-up reel; a switch 17 which turns on when the tape is mounted; a pull-up resistor 18; and the optical reading and information detecting part 19 shown in FIG. 2. FIG. 1 further includes a magnetic head 25 which records and reproduces various information signals on and from a magnetic tape which is contained in a cassette 16; a recording/reproduction circuit 26 for recording and reproduction; and a signal processing circuit 27 which is arranged to process a reproduced information signal supplied via the recording/reproduction circuit 26 and to perform a signal processing action on a signal to convert it into a signal form suited for recording before it is supplied to the recording/reproduction circuit 26.

With the apparatus arranged in this manner, the MPU 11 is arranged to set circuit constants of varied kinds disposed within the recording/reproduction circuit 26 and the signal processing circuit 27 on the basis of characteristic data supplied via the optical reading and information detecting part 19 and the I/O port 12.

The details of operation of the arrangement shown in FIG. 1 are described step by step with reference to FIG. 3 as follows: Step S1: When the tape is mounted on the magnetic tape recording and reproducing apparatus, the switch 17 turns on. The level of a signal INS then changes from a high level (hereinafter referred to as "H") to a low level (hereinafter referred to as "L"). This signal INS is supplied via the I/O port 12 to the MPU 11. The MPU 11 detects that the signal INS is at "L". Step S2: The MPU 11 then outputs an instruction from a terminal STS to instruct the reel motor control circuit 13 to rewind the tape at a high speed.

Step S3: After the step S2, the instruction from the MPU 11 to the motor control circuit 13 is supplied via the I/O port 12. Upon completion of tape rewinding, the beginning part of the tape is detected through a signal STP which is an output of the circuit of FIG. 2. An instruction for bringing the motor to a stop is outputted from a terminal STS. The motor is brought to a stop. Step S4: The flow of operation waits for the mechanism of the apparatus to some to a complete stop. Step S5: When the mechanism comes to a complete stop, the MPU 11 supplies an instruction for a reproducing action on the tape from the terminal STS to the motor control circuit 13. In response to this instruction, the motor control circuit 13 causes the motor to make normal rotation. Step S6: When the tape begins to travel, the optical reading and information detecting part 19 reads information on characteristics of the tape which is written at the beginning part of the tape. The contents of the tape characteristic information is transmitted to the MPU 11 via a terminal SP of the I/O port 12. This flow of operation enables the circuit constants, etc., to be immediately set on the basis of the tape characteristic information as soon as the tape is inserted.

Further, the circuit constants include, for example, a bias value in the recording/reproduction circuit 26 and the number of quantizing bits to be used for analog-to-digital conversion at the signal processing circuit 27.

Next, the details of the operation of the optical reading and information detecting part 19 are described with reference to FIG. 2 as follows:

Referring to FIG. 2, a magnetic tape 20 is provided with a leading tape which is arranged at the beginning of the tape 20 to indicate information on characteristics of the tape 20 by means of transparent and opaque zones and also with a trailing tape which is disposed at the end of the tape 20. The illustration of FIG. 2 includes a light emitting element 22; a driving power supply 24 for the light emitting element 22; a resistor 26; a light receiving element 28; and a prism 30. The prism 30 is arranged within a tape cassette to return to the light receiving element 28 a light flux which is emitted from the light emitting element 22 and passes through the transparent zone of the magnetic tape 20. More specifically, the light emitting element 22 and the light receiving element 28 are disposed on the same side relative to the magnetic tape 20. The prism 30 is disposed opposite to the light emitting element 22 and the light receiving element 28 across the magnetic tape 20. Further, the light emitting element 22 and the light receiving element 28 are located on a straight line perpendicular to the longitudinal direction of the magnetic tape 20.

A comparison circuit 32 is arranged to convert the output of the light receiving element 28 into a TTL (transistor-transistor logic) level signal. A decoder 34 is arranged to decode binary information outputted from the comparison circuit 32. A known bar code decoder or the like may be employed as the decoder 34. The output of the decoder 34 indicates information on characteristics of the tape 20 (tape characteristic information) and is supplied to a circuit (not shown) which is arranged to set a necessary circuit constant of the recording/reproduction circuit 26 as required by the embodiment. A monostable multivibrator (hereinafter referred to as an MM circuit) 36 is arranged to receive the output of the comparison circuit 32. The output of the MM circuit 36 is used as the signal for bringing a reel and a capstan to a stop as mentioned in the foregoing.

The operation of the circuit shown in FIG. 2 is described as follows: the light emitting element 22 is arranged to constantly emit its light toward the prism 30. When the transparent zone 6 of the leading tape of the magnetic tape 20 arrives at the light emitting element 22 with the magnetic tape 20 rewound, the output light of the light emitting element 22 passes through the magnetic tape 20. The light is then reflected by the prism 30 to fall on the light receiving element 28. At the opaque zone 4 of the leading tape of the magnetic tape 20, the output light of the light emitting element 22 does not come to the light receiving element 28. Therefore, the output of the light receiving element 28 becomes a signal corresponding to a bar code formed by the transparent and opaque zones of the leading tape of the magnetic tape 20.

The output of the light receiving element 28 is converted by the comparison circuit 32 into a TTL level. FIGS. 4(a) and 4(b) respectively show, by way of example, the waveforms of the input and output of the comparison circuit 32. FIG. 4(d) shows a pattern formed at that time by the transparent and opaque zones provided on the magnetic tape 20.

The decoder 34 decodes the output of the comparison circuit 32. The tape characteristic information which is thus decoded is transmitted to the MPU 11 through the I/O port 12 shown in FIG. 1. In accordance with the information, the MPU 11 gives an instruction to the circuit which is arranged to set circuit constants. The circuit constants thus can be set at values suited to the characteristics of the tape in use. The magnetic tape recording and reproducing apparatus, therefore, can be operated in a state best suited to the magnetic tape.

The MM circuit 36 is arranged to be triggered by the "H" (high level) of the output of the comparison circuit 32 to remain at an "H" for a long period of time when the level of the output becomes high. FIG. 4(c) shows by way of example the waveform of the output of the MM circuit 36. The output waveform indicates the start position of the leading tape of the magnetic tape and is used as a motor stop signal.

Further, in the case of this embodiment, the tape characteristic information is arranged to be obtained through the binary signal formed by the transmission and no transmission of light. However, this invention is not limited to this arrangement. The tape characteristic information may be arranged to be obtained from a multi-valued signal according to the transmission factor of the leading or trailing tape. Such arrangement would increase the amount of information on the characteristics of the tape. It is also possible to read out the tape characteristic information through the reflection of light, instead of the transmission of light, by using aluminum foil or the like. Further, the tape characteristic information may be read out by some other suitable means utilizing, for example, electrical conductivity and nonconductivity.

This invention is applied to an apparatus usable both for recording and for reproduction in the case of this embodiment. However, the invention is of course not limited to the apparatus of this kind. The invention is applicable also to an apparatus to be used solely for recording or solely for reproduction. Therefore, in the appended claims, the apparatus is defined as "recording and/or reproducing apparatus" to cover the apparatuses of all these kinds.

In accordance with the arrangement of the embodiment of this invention described in the foregoing, a recording or reproducing operation can be performed in a condition best suited to the characteristics of the tape in use by setting the circuit constants of necessary circuits according to such subtle differences that exist in tape characteristics among tapes of different kinds and are hardly detectable through the detection hole provided in the cassette of the tape.

What is claimed is:

1. A magnetic tape recording and/or reproducing apparatus comprising:
    a) a characteristic information of a magnetic tape detecting means for detecting characteristic data written on a tape portion attached to the magnetic tape, said characteristic data being data of the characteristics of said magnetic tape, said characteristic information being indicated in plural bit data;
    b) circuit means arranged to allow circuit characteristics of said circuit means of said magnetic tape recording and/or reproducing apparatus to be variably set; and
    c) control means for setting the circuit characteristics of said circuit means on the basis of a detection output of said magnetic tape characteristic information detecting means.

2. An apparatus according to claim 1, wherein said recording medium includes a magnetic tape, and wherein said characteristic data is recorded on said magnetic tape in a predetermined repetitive pattern composed of optically transmissive and nontransmissive parts.

3. An apparatus according to claim 1, wherein said tape characteristic information detecting means includes means for optically reading said characteristic data.

4. An apparatus according to claim 1, wherein said characteristic data is recorded in an end part of a magnetic tape.

5. A magnetic tape recording/reproducing apparatus, comprising:
    (a) first detecting means for detecting that a recording medium has been mounted;
    (b) second detecting means for detecting characteristic information of said mounted recording medium, said characteristic information written on a tape portion attached to the magnetic tape being information of the characteristics of said magnetic tape;
    (c) circuit means arranged to allow circuit characteristics of said circuit means of said magnetic tape recording/reproducing apparatus to be variably set; and
    (d) control means for causing said second detecting means to operate in response to a detection output of said first detecting means and for setting the circuit characteristics of said circuit means on the basis of a detection output of said second detecting means.

6. An apparatus according to claim 5, wherein said recording medium includes a magnetic tape, and wherein said characteristic information is recorded on said magnetic tape in a predetermined repetitive pattern composed of optically transmissive and nontransmissive parts.

7. An apparatus according to claim 5, wherein said second detecting means includes means for optically reading said characteristic information.

8. An apparatus according to claim 5, wherein said characteristic information is recorded in an end part of a magnetic tape.

9. An apparatus according to claim 5, wherein said control means includes a microcomputer.

* * * * *

UNITED STATES PATENT AND TRADEMARK OFFICE
CERTIFICATE OF CORRECTION

PATENT NO. : 5,561,565

DATED : October 1, 1996

INVENTOR(S) : Katsumi Arisaka, et al.

It is certified that error appears in the above-indentified patent and that said Letters Patent is hereby corrected as shown below:

On the cover page, after Item [22], insert

--[30] Foreign Application Priority Data

April 30, 1991 [JP] Japan.......................03-098433
February 18, 1992 [JP] Japan....................04-030546 --.

Signed and Sealed this

Twenty-eighth Day of October, 1997

Attest:

BRUCE LEHMAN

Attesting Officer          Commissioner of Patents and Trademarks